Jan. 2, 1945. C. W. MOTT 2,366,281
TRACTOR-MOUNTED IMPLEMENT
Filed Nov. 22, 1941 2 Sheets-Sheet 1
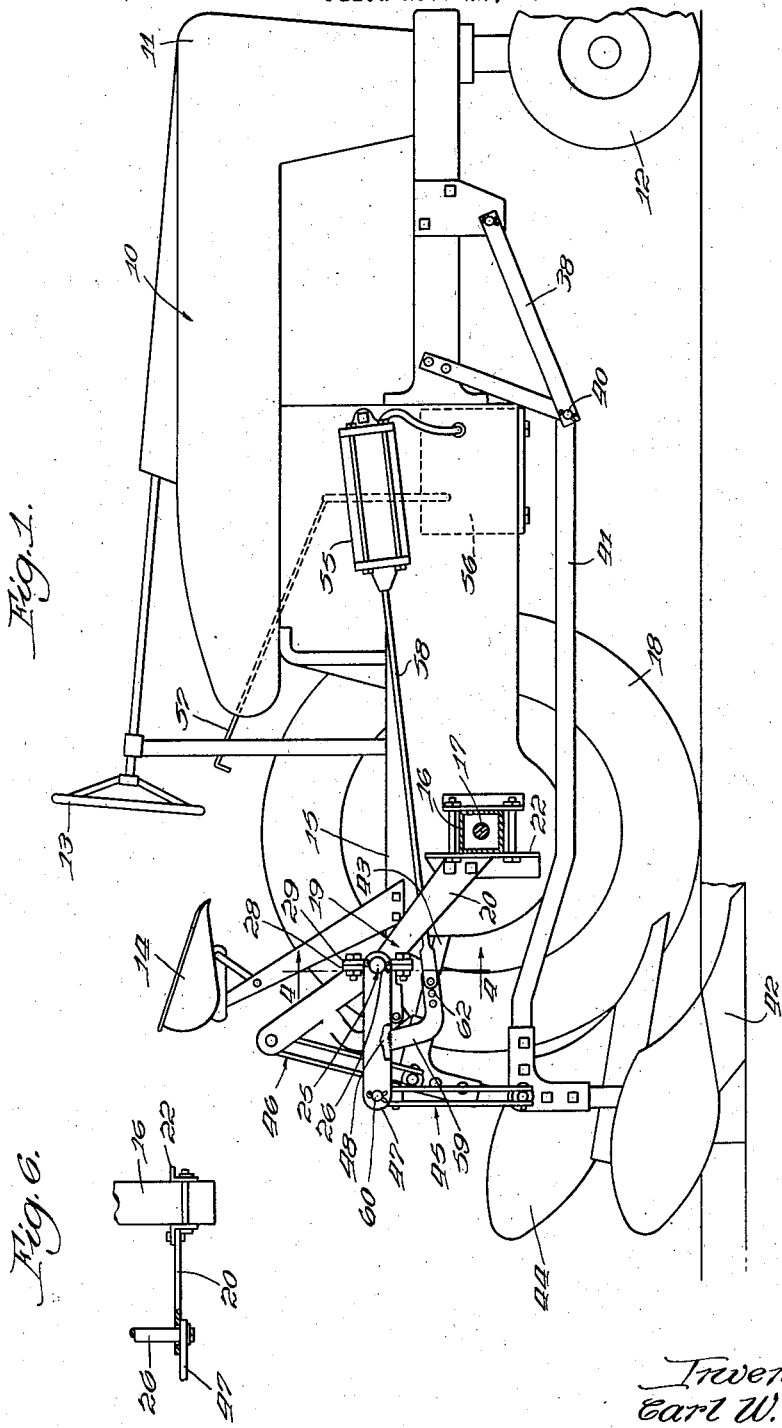
Inventor:
Earl W. Mott.
By Paul O. Pippel
Atty.

Jan. 2, 1945.   C. W. MOTT   2,366,281
TRACTOR-MOUNTED IMPLEMENT
Filed Nov. 22, 1941   2 Sheets-Sheet 2
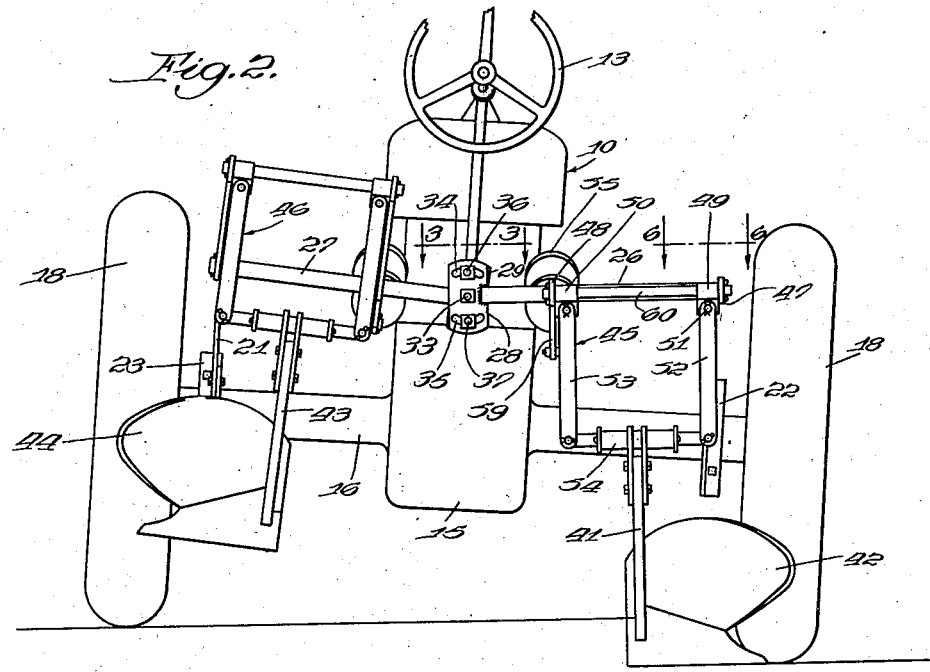
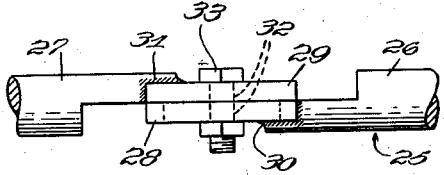
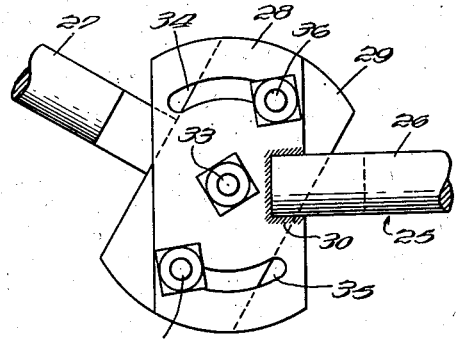
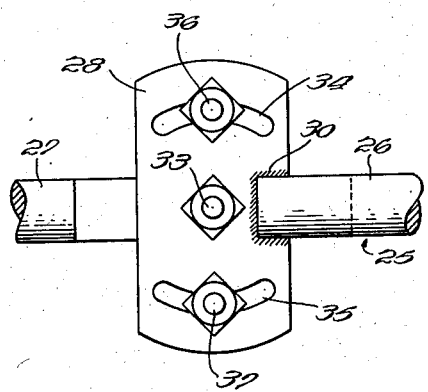
Inventor:
Earl W. Mott.
By Paul O. Pippel
Atty.

Patented Jan. 2, 1945

2,366,281

UNITED STATES PATENT OFFICE 2,366,281

TRACTOR-MOUNTED IMPLEMENT

Carl W. Mott, La Grange, Ill., assignor to International Harvester Company, a corporation of New Jersey Application November 22, 1941, Serial No. 420,103

4 Claims. (Cl. 97—47)

This invention relates to tractor-mounted implements of a type adapted to be connected to the tractor where the working tools have alternate operation such as with direct-connected two-way plows and, more particularly, to means for leveling the plow bottoms forming a part of the implement.

It is an object of the present invention to provide in a direct-connected implement of a type having working tools arranged for alternate operation means common to both of the working tools for simultaneously laterally leveling the same.

It is another object of the invention to provide common adjusting means for simultaneously leveling the transversely spaced plow bottoms of a tractor-mounted or direct-connected two-way plow.

According to the present invention, the alternate plow bottoms are connected to a common transversely extending means about which lifting means is operable to effect a vertical lifting of the plow bottoms. Each of the plow bottoms has independent means for lifting the same respectively to a transport position. This transversely extending means serving to support the lifting means is constructed for adjustment intermediate its length, wherein the same may be distorted to thereby effect a lateral tilting of the lifting means and of the plow bottoms respectively connected therewith. Each lifting means includes a pair of spaced arms rotatable about the transversely extending supporting means, and, as the transversely extending transporting means is adjusted or buckled, the inner arms of the respective lifting means are lowered or raised simultaneously, thereby giving a vertical movement to the inner edges of the respective plow bottoms.

For other objects and for a better understanding of the invention, reference may be had to the following detailed description taken in connection with the accompanying drawings, in which:

Figure 1 is a side elevational view of a tractor with one of its rear wheels removed, and of the implement connected thereto embodying the features of the present invention;

Figure 2 is a rear view of the tractor and of the implement attachment with the right-hand working tool or plow bottom in its plowing position and with one of the wheels of the tractor running in a plow furrow;

Figure 3 is an enlarged detail view taken along the line 3—3 of Figure 2 and of the adjustable portions of the transversely extending supporting means;

Figure 4 is an enlarged detail view taken along the line 4—4 of Figure 1 and showing in plan these adjustable portions;

Figure 5 is a plan view of these adjustable portions, similar to Figure 4, but after the portions have been adjusted to effect lateral leveling of the plow bottoms; and Figure 6 is a fragmentary plan view taken along the line 6—6 of Figure 2, showing part of one of the adjustable portions.

Referring now particularly to Figures 1 and 2, there is shown a tractor 10 having a forward portion 11 supported by a dirigible wheel 12 adapted to be operated by a hand wheel 13 accessible to an operator's station 14 on a rear portion 15 of the tractor. The rear portion 15 includes a transversely extending rear axle housing 16, through which extends the rear axles 17 for connection with the tractor drive wheels 18 serving to support the rear portion of the tractor. This transversely extending rear axle structure 16 serves as a means for the attachment thereto of a bracket structure, indicated generally at 19, and including vertically extending members 20 and 21 located respectively at the right- and left-hand sides of the tractor and respectively clamped to the rear axle structure, as shown more clearly in Figure 1, by clamping devices 22 and 23. It will be noted that these clamping devices 22 and 23 are connected to the rear axle housing structure at locations considerably removed from the center of the tractor.

On the upper ends of the members 20 and 21 is supported a transversely extending supporting means 25 taking the form generally of a shaft member composed of two shaft parts 26 and 27 having respectively on their inner ends the plate portions 28 and 29 (see particularly Figures 3, 4, and 5). These plates are welded respectively to their shafts so that the cooperating faces of the same will be flush with one another (see Figure 3). The welding of the plate 28 on the shaft 26 is indicated at 30, while the welding of the plate 29 on the shaft 27 is indicated at 31.

Each of the plates 28 and 29 has cooperating central openings 32, through which extends a centrally disposed bolt means 33. This bolt means 33 serves as a pivot about which the plates 28 and 29 are respectively adjusted. Also, each of the plates has upper and lower arcuate slots 34 and 35, respectively. These arcuate slots are formed in an arc in equally spaced relationship from the pivot point 33 and about the same but on opposite sides thereof. Extending through the slotted openings 34 of the respective plates is a bolt means 36, while extending through the lower openings 35 in the respective plates is a bolt means 37. When all of the bolt means 33, 36, and 37 are tightened, the shafts 26 and 27 provide a rigid, transversely extending supporting means and form a part of the bracket structure 19.

Referring now particularly to Figure 1, there is shown on the forward portion 11, a draft bracket structure 38 having a transversely extending member 40 for the connection to the same of a longitudinally extending draft beam structure 41, on the rearward end of which is a right-hand plow bottom 42. On the opposite or left-hand side of the tractor is provided a draft beam structure 43 similar to the draft beam structure 41, but on the rearward end of which there is provided a left-hand plow bottom 44. The draft beam structure 43 for the left-hand plow bottom is similarly connected to the forward portion of the tractor by the draft structure 38.

On the transversely extending supporting means 25, at the right- and left-hand sides of the tractor and in vertical alinement respectively with the rear portions of the draft beam structures 41 and 42, are lifting means 45 and 46. One of these lifting means will now be described in detail, and it should be apparent that the lifting means at the opposite side of the tractor is of similar construction. The lifting means 45 on the right-hand side of the tractor will now be described. The lifting means 45 includes rearwardly extending arms 47 and 48 journaled at their forward ends on the transverse supporting shaft means 25. These arms are transversely spaced and the inner arm 48 is located much closer to the central pivot means 33 of the transversely extending supporting means. On the outer ends of the respective arms 47 and 48 is provided respectively the trunnion elements 49 and 50 pivoted with respect to the arms for fore and aft pivotal movement. To these trunnions there are respectively connected for lateral swinging movement, as indicated at 51, depending arms 52 and 53 between lower ends of which is pivotally connected a transversely extending element 54 serving as a means for the connection of the draft beam structure 41 to the swingable links 52 and 53. The connection of the draft beam structure with the transverse element 54 is rigid, so that any lateral tilting movement imparted to the transverse element 54 will be in turn imparted to the draft beam structure 41 and its plow bottom 42.

Associated with each of the lifting means 45 and 46, and shown particularly in connection with the lifting means 45, is provided a fluid cylinder device 55 adapted to receive fluid from a pump and valve mechanism 56 located in the body of the tractor intermediate its forward and rearward portions and adapted to be controlled from a control rod 57 accessible to the operator's station 14. When fluid is passed to the fluid cylinder device 55, the piston rod 58 is moved rearwardly, and, being connected to a bracket arm 59 rigid with the arm 48, will impart motion to the lifting means 45 to rock the same in a clockwise direction about the transverse supporting-shaft means 25. Lifting movement of the arm 47 is imparted to the opposite arm 48 through a shaft 60 serving to interconnect the arms 47 and 48 and at the same time serving as means for the connection of the trunnions 49 and 50 to the respective arms 47 and 48. It will be understood that a similar fluid arrangement may be provided on the left-hand side of the tractor for effecting lifting movement of the lifting means 46 on that side of the tractor, that a separate control element 57 can be also provided so that independent operation of the respective plow bottoms 42 and 44 is conveniently had.

The vertical adjusting depth of the respective working tools 42 and 44 is controlled by the respective fluid device which thereby serves as a means for both lifting and adjusting of the respective plow bottoms 42 and 44. The working depth is controlled by the amount of fluid being present in the fluid cylinder device 55 during the working operation, by an adjustment of the piston rod 58 with the bracket 59, as indicated at 62, or by a combination of both this means 62 and the fluid in the cylinder device 55.

As shown in Figure 2, the plow bottom 42 may be said to be in its normal plowing position. It will be noted that in this position the plates 28 and 29 substantially coincide with one another and with the shafts 26 and 27 of the transversely extending supporting means are substantially in axial alinement. Should the plow bottom 42 be adjusted for a greater plowing depth, the right-hand plow wheel 18 will be lowered and a greater lateral tilt is given to the tractor. In such a case, the plow bottom 42 would have to be laterally leveled for its proper operation in the ground. This is effected by adjusting the plates 28 and 29 so that they may take the position shown in Figure 5 and with the shafts 26 and 27 forming a considerable angle with respect to each other. Upon performing this operation, the supporting link 53 is considerably lowered and the inner face of the plow bottom will likewise be lowered to bring it into its proper relation with the ground.

It should now be apparent that also while adjusting the plow bottom 42 a similar adjustment is given to the plow bottom 44 which does not happen to be at the moment in its plowing position. As the tractor is returned over the field for plowing with the plow bottom 44, the plow bottom will be in its proper position, the same having been adjusted the same time as the plow bottom 42 is adjusted. It will be noted that the inner lifting arms of the lifting means 45 and 46 are lowered to thereby simultaneously and laterally level the plow bottoms 42 and 44. There is provided at the connections of the supporting means 45 with the vertical members 20 and 21 sufficient looseness to allow for this adjustment of the shafts 26 and 27, as indicated in Figure 6. Should the plow bottom 42 be adjusted for a more shallow plowing depth, the plates 28 and 29 will be angularly adjusted in an opposite direction from that shown in Figure 5 and the shafts 26 and 27 buckled upwardly from a more or less central position, such as shown in Figure 4.

It should now be apparent that there has been provided a simple and common means for laterally leveling both of the plow bottoms of a directly-connected two-way plow, and that such means is provided in a supporting means common to both the lifting means 45 and 46 for the respective plow bottoms 42 and 44.

While various changes may be made in the detail construction of the present invention, it shall be understood that such changes shall be made within the spirit and scope of the present invention as defined by the appended claims.

What is claimed is:

1. In combination, a tool-supporting structure having a fore and aft principal axis, working tools, means for connecting the working tools to the tool-supporting structure including lifting structures respectively connected with the working tools, supporting means for supporting the lifting structures, and the said supporting means including parts extending outwardly transversely of said axis and pivotally connected at inner end portions for simultaneous vertical adjustment of said end portions to determine their angularity about an axis parallel with said principal axis, said supporting means parts respectively supporting said lifting structures to simultaneously impart corresponding leveling adjustment to the tools when the elevation of said inner end portions of said parts is changed, and means upon and vertically movable with said end portions to releasably retain them in their adjustment.

2. In combination, a plow-supporting structure, a plow bottom having a fore and aft principal axis, means for connecting the plow bottom to the plow-supporting structure including shafts extending transversely of said axis from adjacently disposed inner ends to dispose outer ends thereof oppositely outwardly, means pivotally supporting the outer ends of said shafts on the plow-supporting structure, the inner ends of said shafts being pivotally connected about an axis generally parallel with said principal axis and at least one of such ends having an arcuate shaped opening therethrough generated about the axis in their connection, bolt means associated with the other adjacent inner shaft end and extending into said opening to secure said ends together in non-pivotal relation but serviceable when loosened to allow the shafts to be angularly adjusted, and means connecting said plow bottom to one of said transversely extending shafts to cause the angular relation of the plow relatively to the horizontal to constitute a function of the angular adjustment of said shaft.

3. A two-way plowing machine, comprising a frame having a fore and aft principal axis, a pair of plows in laterally spaced positions to said frame and connected therewith for up and down movement between operating and transport positions and for lateral tilting relatively to the frame to maintain an upright position while the frame is laterally tilted, support means upon opposite lateral sides of said frame, a pair of elongated tiltable members having outer end portions of which one is pivotally connected with the support means at one side of the frame and of which outer end portions the other is pivotally connected with the support means at the other side of the frame and said elongated tiltable members projecting oppositely inwardly to dispose inner end portions of such members adjacently to each other, said elongated members being adjustably tiltable about their connections with said support means and such tiltable adjustment being selected by adjusting the elevation of the inner end portions of said members while incurring corresponding adjustment in the relative angularity of said members, plow-lifting means respectively connecting said plows with said tiltable members and operable thereby to tilt the plows in the same direction of tilting that their respectively associated tiltable members are tilted, and means movable with the inner ends of said members to releasably maintain them in their relative angularity incurred by selected tilting adjustments thereof.

4. A two-way plowing machine, comprising a frame having a fore and aft principal axis, a pair of plows in laterally spaced positions to said frame and connected therewith for up and down movement between operating and transport positions and for lateral tilting relatively to the frame to maintain an upright position while the frame is laterally tilted, support means upon opposite lateral sides of said frame, a pair of tiltable rock-shaft structures having outer end portions pivotally connected with said support means and said structures projecting oppositely inwardly from said support means to dispose inner end portions of such rock-shaft structures adjacently to each other, said rock-shaft structures being adjustably tiltable about their connections with said support means and such tilting adjustment being selected by adjusting the elevation of the inner end portions of said structures while incurring corresponding adjustment in the relative angularity thereof, plow-lifting means respectively connecting said plows with the rock-shaft structures and operable thereby to raise and lower the plows when rocked and also operable, when tilted, to tilt the plows in the same direction their respective rock-shaft structures are tilted, and means movable with the inner ends of said rock-shaft structures to releasably maintain them in their relative angularity incurred by selected tilting adjustments thereof.

CARL W. MOTT.